April 4, 1961
A. R. MORSE
2,977,634
BLEED BACK FOR INJECTION MOLDING CYLINDERS
Filed Aug. 4, 1958
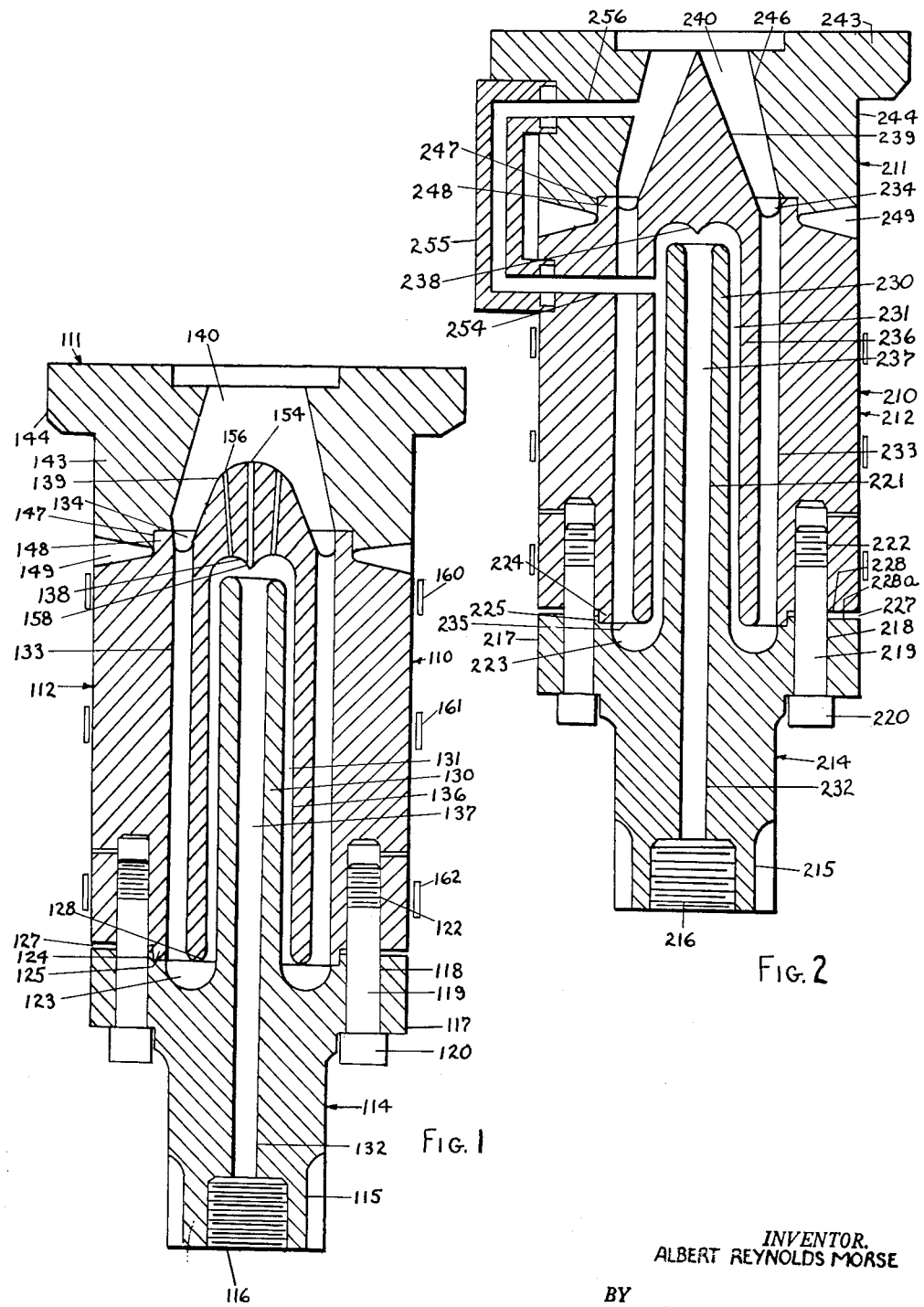
INVENTOR.
ALBERT REYNOLDS MORSE
BY
Charles F. Lorenchuk
attorney United States Patent Office 2,977,634
Patented Apr. 4, 1961

2,977,634
BLEED BACK FOR INJECTION MOLDING CYLINDERS

Albert Reynolds Morse, Cleveland, Ohio, assignor to Injection Molders Supply Company, Cleveland, Ohio Filed Aug. 4, 1958, Ser. No. 752,791

12 Claims. (Cl. 18—30)

This invention relates to heating cylinders and, more particularly, to heating cylinders for use on injection molding machines.

The invention disclosed herein provides an improvement in a reverse flow heating cylinder by disclosing a means for ventilation of the hot gases from the molten plastic by way of a bypass to return the hot gases along with relatively small portions of hot plastic into the inlet in the voids between the cold incoming granular plastic material. This ventilation is accomplished by providing a bypass passage from the inlet to the second reverse flow passage.

The voids or air spaces between the granules in the ordinary cylinders are excellent heat insulators. Therefore, the ordinary heating process of the plastic material is inherently inefficient since it is difficult to drive heat across the voids from one granule to another. In the present application, the hot plastic bypassed back into the incoming granular material fills the voids between the granules and "wets" the surface of the plastic granules, partially melting them and thus bringing the resulting plasticized mass into heat conducting relation with the walls of the passages through the cylinder. The result is that heating is done by heat conduction through a well recognized efficient "liquid immersion" process as contrasted to the usual inefficient transfer of heat from the internal walls of the cylinder from one granule to another. Thus, the heat transferred from the hot plastic material to the incoming granules pre-softens the material prior to the next "shot." Therefore, in the cylinder disclosed herein, the material will be pre-softened when it enters the spreader holes instead of being in cold granular form. This results in lower pressures and faster injection. The return of hot plastic through the various bypass openings also tends to displace air which is ordinarily trapped between the granules and carried into the average cylinder. It follows that the resulting molded parts will be more strain free because the gas and entrapped air are vented from the molten plastic material prior to injection.

Tests have proved that entrapped air and gases in molded plastic articles cause weak spots. This air is in the form of bubbles when the plastic is not under pressure. When the plastic is under pressure, the air becomes dissolved in the plastic material and sometimes burns, causing brown streaks, laminations, and welds in the material and, consequently, in the molded article. When viewed under polarizing light, these gas type welds and laminations can be distinguished from other strains caused by spreader legs, pins, or flutes or by laminar flow of plastic material through the conventional heating cylinder.

More specifically, it is an object of this invention to provide a heating cylinder for an injection molding machine which is simple in construction, economical to manufacture, and simple and efficient in operation.

Another object of the invention is to provide an injection molding machine which provides mixing and melting efficiencies heretofore only obtainable with costly preplasticizing devices, in combination with a gas or trapped air bypass or bleed back.

Yet another object of this invention is to provide a heating cylinder of the reverse flow type wherein a bypass path is provided between a reverse flow passage and an inlet whereby hot plastic material can be returned from the reverse flow passage to the inlet with a view to utilizing the latent heat in the hot plastic when interspersed among cold incoming granules.

A further object of the invention is to provide an external bypass flow passage in a reverse flow heating cylinder accomplishing some of the above objectives.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention in order to adapt the invention to all of the different makes and models of injection machines on which the cylinder may be used.

In the drawing:

Fig. 1 is a view of a heating cylinder according to the invention; and

Fig. 2 is a view of another embodiment of the invention.

Now with more specific reference to the drawing, in Fig. 1, a heating cylinder 110 is shown having a clamping section 111 and a spreader section 112 and a nozzle section 114.

The nozzle section 114 has a reduced size section 115 terminating in a threaded bore 116 for attaching to a suitable connecting means for attaching it to a suitable die. The reduced size section 115 is integrally connected to an enlarged end 117 which is, in effect, a flange extending outwardly from the reduced size section 115. Spaced bores 118 receive studs 119 having heads 120 in the bores 118. The studs 119 threadably engage threaded holes 122 in the spreader section 112. An annular groove 123 is formed in the end of the nozzle section 114 adjacent the spreader section 112. The groove 123 forms an end for the passage made up of bores 131 and 133. Outwardly of the annular groove 123 is formed an annular groove 125 which receives an annular rim portion 124 on the end of the spreader section 112 and overlies the portion 124 and thus holds the spreader section 112 and the nozzle section 114 in alignment.

When the nozzle section 114 and the spreader section 112 are attached together with the rim 124 in the groove 123, a peripheral space 127 is formed between sections 112 and 114 so that the force of the studs 119 is concentrated on the rim 124 in the groove 125, holding the two sections 112 and 114 together and sealed against leakage. The nozzle section 114 has a tubular intermediate member 130 integrally attached thereto and forming the inner wall of the second passage. The tubular member 130 extends into the bore 131 in the spreader section 112 and a bore 137 through the tubular member 130 forms a continuation of a bore 132 in the outer end of the nozzle section 114. The bores 132 and 137 in the tubular member 130 from a storage tube.

The spreader section 112 is a cylindrical section having the spaced bores 133 extending therethrough terminating at their upper ends in a groove 134 formed in the end of the spreader section 112 and at the lower end communicating with the groove 123. The spaced bores 133 form a first passage through the cylinder 110 for plastic to flow.

A central bore 136 is formed in the spreader section 112 extending from the end adjacent the nozzle section 114. The walls between the bores 133 and the bore 136 are rounded at 128. The central bore 136 terminates in a blind end at 138 and receives the tubular member 130. The blind end 138 of the central bore 136 may be formed as shown and a central conical raised central member 158 forms a baffle for directing the plastic material into the storage tube formed by the bores 132 and 137. The central upper end of the spreader section 112 terminates in a rounded end 139 which is of hemispherical shape and extends into an inlet passage 140 of the flange or clamping section 111.

The clamping section 111 has a body portion 143 generally cylindrical in shape with a flange 144 extending outwardly therefrom and attached thereto. The flange 144 provides a means for attaching the cylinder 110 to an injection molding machine or the like. The clamping section 111 has the inlet passage 140, the walls of which communicate with the first passage through the bores 133. The walls of the bore 136 form a second flow passage between the walls thereof and the outside wall of the tubular member 130. The storage tube forms the third passage.

The lower end of the flange section 111 is counterbored at 147 to receive upwardly extending rims 148 of the spreader section 112. The flange section 111 and the spreader section 112 have a peripheral groove machined therebetween to receive welding material 149 to hold the cylinder 110 in assembled relation. The overlying shoulders formed by the edges of the counterbore 147 hold the flange section 111 and the spreader section 112 in alignment.

The end 139 of the spreader section 112 has a relatively small central bore 154 and radially spaced, outwardly inclined bores 156 therethrough. The bores 154 and 156 allow hot gases from the hot plastic in the storage tube formed by the bores 132 and 137 to escape to the incoming granular material in the inlet passage and, also, allow some hot plastic to flow back into the inlet passage which will enter the voids between the granular plastic material and form a wetted surface thereon. This will increase the rate at which heat may be driven into the incoming plastic material. The bores 156 are so aligned that they may be cleaned by inserting a rod from the inlet through the bores 156 without dismantling the cylinder 110. Conventional heating bands are represented by numerals 160, 161, and 162.

In the embodiment of the invention shown in Fig. 2, a heating cylinder 210 is shown for use with an injection molding machine for plastic. The cylinder 210 has a clamping section 211, a spreader section 212, and a nozzle section 214. The nozzle section 214 has a reduced size end 215 terminating in a threaded bore 216 for attaching to a suitable connecting means for connecting to a plastic molding die. The reduced size end 215 is integrally attached to an enlarged end 217 which is, in effect, a flange extending outwardly from the reduced size end 215.

Spaced bores 218 receive studs 219 having heads 220. The studs 219 threadably engage threaded holes 222 in the spreader section 212. An annular groove 223 is formed in the end of the nozzle section 214 adjacent the spreader section 212 and concentric thereto. Outwardly of the annular groove 223 is formed an annular bore 225 which receives an annular end portion 224 of the spreader section 212 and overlies the end portion 224 and holds it against outward movement. When the nozzle section 214 and the spreader section 212 are joined together, a peripheral groove 227 is formed therebetween. The groove 227 forms a space between surfaces 228 and 228a so that the force of the studs 219 is concentrated on the annular end portion 224, holding the sections 212 and 214 together and thereby sealing them against leakage therebetween.

The nozzle section 214 has a tubular inner member 230 integrally attached thereto and forming an inner wall and a continuation of the inner wall of the annular groove 223. The tubular member 230 extends into a bore 231 in the spreader section 212 and a bore 221 through the tubular member 230 forms a continuation of a bore 232 in the outer end of the nozzle section 214 and the bore in the tubular member 230.

The spreader section 212 is a cylindrical section having spaced bores 233 extending therethrough and terminating at the upper end at 234 and at the lower end at 235. The bores 233 form a first passage through the cylinder 210. The central bore 231 has walls 236 which extend from the end adjacent the nozzle section 214 toward the other end and the central bore 231 receives the tubular inner member 230 as aforesaid. The bore 231 terminates in a blind end and the blind end may be formed as shown with a central conical raised member 238 which forms a directing baffle for directing the plastic material into a storage tube 237 made up of the bores 221 and 232. The central upper end of the spreader section 212 terminates in a spreader tip 239 which has a conical shape and extends into an inlet 240 of the clamping or flange section 211.

The clamping section 211 has a body portion 244 with a flange 243 outwardly extending therefrom and integrally attached thereto. The flange 243 provides a means for attaching the cylinder 210 to an injection molding machine. The flange section 211 has a tapered bore 246 which forms an inlet to the bores 233 which constitute the first passage. The bore 231 forms the second flow passage and the storage tube 237 forms the third passage.

The lower end of the flange section 211 is counterbored to receive an upwardly extending rim 248 of the spreader section 212. A groove is machined between the flange section 211 and the nozzle section 214 to receive welding material 249 to hold the flange section 211 and the nozzle section 214 in rigid assembled relation. The overlying shoulders formed by the edges of a counterbore 247 hold the flange section 211 and the spreader section 212 in registration with each other.

Bores 254 extend through the walls of the spreader section 212 and communicate with the central bore 231 therein and through the bores 254, the plastic material from the second flow passage may pass through a pipe 255 to a bore 256 and thereby return to the inlet. Also, hot gases from the plastic material may be vented through the bores 254 from the hot plastic in the second passage to the cold granular plastic in the inlet. A plurality of pipes 255 and bores 254 and 256 may be disposed around the heating cylinder 210 to provide a better distribution of the venting of the gases from the plastic.

The inlet may be made of large enough capacity that it will contain a quantity of plastic equal to that required for a "shot" so that all of the plastic material will be preheated for a "shot" before it is forced into the flow passages of the cylinder.

The foregoing specification sets forth the invention in its preferred practical forms but it will be understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A heating cylinder for plastic comprising a hollow body having an inlet and an outlet, a spreader in said body, said spreader being disposed generally concentric to said hollow in said body and spaced therefrom defining a first flow passage therebetween communicating with said inlet, a cylindrical area in said spreader concentric with said first flow passage and communicating therewith and defining a second flow passage connected to said first flow passage, a storage tube formed in said spreader concentric with said second flow passage and communicating with said outlet to said cylinder, bypass means connecting said second flow passage with said inlet whereby a small amount of plastic may be returned from said second flow passage to said inlet, and means connecting said storage tube to said inlet whereby gases and a relatively small amount of molten plastic may mix with the incoming plastic.

2. A heating cylinder for injection molding comprising a hollow body having a first, a second, and a third flow passage therethrough, said first flow passage communicating with an inlet at one end and with said second flow passage at the other end, said second flow passage being connected with said third flow passage at the end thereof opposite to said end connected to said first flow passage, said third flow passage being connected to an outlet, said flow passages being arranged so that the flow therethrough in said second flow passage is in a direction one hundred eighty degrees to the flow through said first flow passage and the flow in said third flow passage is in the same direction as in said first flow passage, said flow passages being disposed concentric to each other, heating means disposed around said hollow body, and a relatively small sized passage connecting said second passage to said inlet, and a bypass passage connecting the end of said second passage which is connected to said third passage to said inlet whereby hot plastic may be fed back into the incoming plastic.

3. A heating cylinder for use in the injection molding of plastic material comprising a hollow body having an inlet adapted to be connected to a source of relatively cold plastic material, an outlet adapted to be connected to a die means, a spreader disposed in said hollow body and defining the inside surface of a first flow passage, said spreader having a conical point extending toward said inlet, a second passage disposed inside said spreader and generally concentric to said first flow passage and connected thereto so that plastic material flows therein in a direction one hundred eighty degrees to the flow through said first passage, a third passage connected to said second passage and concentric thereto and connecting said second passage to said inlet, means connecting a part of said second passage to said inlet whereby hot plastic from said second passage may mix with plastic at said inlet, and heating means for said cylinder.

4. The clyinder recited in claim 3 wherein said connecting means comprises a bypass passage extending from said second passage outside said cylinder to said inlet.

5. The cylinder recited in claim 4 wherein the cross sectional area of said third passage is less than the cross sectional area of said first and second passages whereby the velocity of flow of plastic through said third passage increses over the velocity of flow through said second passage.

6. The cylinder recited in claim 3 wherein said conical point has a surface facing said inlet in the shape of a hemisphere, and said means connecting said second passage to said inlet comprises radially spaced bores through said conical point.

7. A heating cylinder for a plastic injection molding machine comprising a hollow body having an inlet and an outlet, a spreader in said body, a first passage between said body and said spreader, a second passage connected to said first passage and extending concentric thereto in a direction one hundred eighty degrees to said first passage, a third passage comprising a storage tube connected to said second passage and disposed one hundred eighty degrees to said second passage and concentric thereto, and bleed back passages connecting said third passage to said inlet.

8. A heating cylinder comprising a generally cylindrical spreader section having a conical member extending from one end thereof and a central bore extending axially therethrough, a groove in one end of said spreader section concentric with said conical member, radially spaced bores through said spreader section communicating with said concentric groove and the opposite end of said spreader section and defining a first flow passage, an axially extending flange on each end of said spreader section, a nozzle section, a bored tubular member on said nozzle section extending into said central bore in said spreader section and defining a second flow passage through said spreader section, a bore in said nozzle section connecting said bore through said tubular member with the outside of said nozzle section, means to connect said nozzle section to a die, a flange section, an inlet in said flange section receiving said conical member, a counterbore in said flange section receiving one of said flanges, and bypass means connecting said second passage with said inlet.

9. A heating cylinder comprising a flange section and a nozzle section with a spreader section therebetween, said sections each having an outside dimension equal to the other and being connected together, an inlet passage through said flange section, a central bore in said spreader section, a tube having a bore therethrough on said nozzle section, said tube on said nozzle section defining a flow passage between it and the wall of said central bore in said spreader section, spaced bores in said spreader section connecting between the end of said central bore in said spreader section remote from said nozzle section to said inlet passage, the bore through said tube connecting the end of said spreader section bore remote from said nozzle section to the outlet from said nozzle section, means closing the end of said bore in said nozzle section adjacent said inlet passage, and a relatively small bypass passage connecting said central bore in said spreader section with said inlet passage whereby gases and hot plastic material may flow from said bore in said tube to said inlet passage.

10. The cylinder recited in claim 9 wherein said means closing said central bore in said spreader section is integral with said spreader section, and said bypass passage extends through said integral means.

11. The cylinder recited in claim 10 wherein said bypass passage comprises radially spaced bores in a conical member in said spreader section, and said bores through said conical member are disposed in alignment with said inlet passage to said cylinder whereby said bores may be cleaned from said inlet passage.

12. The cylinder recited in claim 9 wherein said bypass passage comprises a flow passage extending from outside said cylinder into the inside thereof, then extending externally and into said inlet passage.

References Cited in the file of this patent

UNITED STATES PATENTS

| 2,405,039 | Jesionowski | July 30, 1946 |
| 2,766,483 | Stokes | Oct. 16, 1956 |
| 2,871,516 | Sherman et al. | Feb. 3, 1959 |

OTHER REFERENCES

Hartmann, German application 1,013,856, printed Aug. 14, 1957 (KL 39a 16), 2 pp. spec.; 1 sht. dwg.